United States Patent Office 3,479,613
Patented Nov. 18, 1969

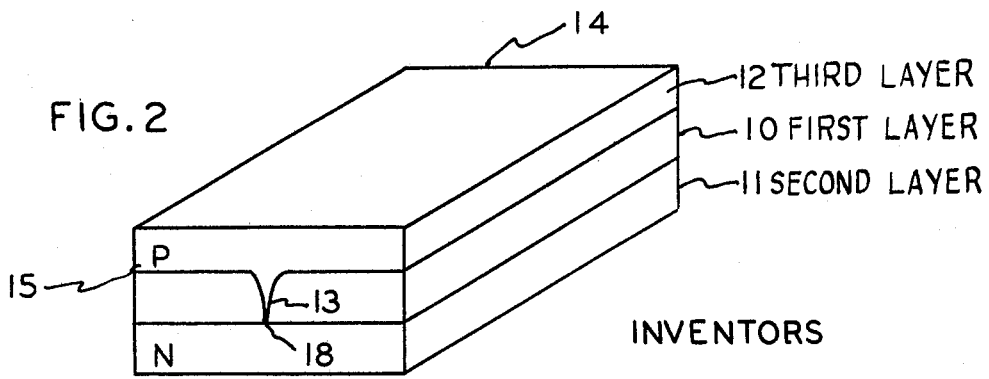

3,479,613
LASER DIODE AND METHOD
Hans Stephan Rupprecht, Yorktown Heights, N.Y., and Manfred Pilkuhn, Braunschweiz, Germany, assignors to the United States of America as represented by the Secretary of the Navy
Filed Apr. 28, 1967, Ser. No. 635,955
Int. Cl. H01s 3/18
U.S. Cl. 331—94.5                                  5 Claims

ABSTRACT OF THE DISCLOSURE

The invention disclosed herein relates to an improved laser device consisting of a substrate have a first N type layer on one side and a P type layer on the other side with a spike-like projection grown through the substrate to form the PN junction.

---

This invention relates to an improved laser device and more specifically to an improved injection laser and methods of producing such devices.

This application discloses a means for making an improved laser device that is produced by a particular method of preparation. Generally, the method includes preparation of gallium arsenide containing low angle grain boundaries, epitaxially growing an N layer on the gallium arsenide layer, diffusing zinc into the gallium arsenide layer with a spike-like profile, and fabricating a Fabry-Perot structure from the body.

During the last several years the field of laser technology has grown to the point where it is now one that has many practical applications. However, there is a continuing effort on the part of investigators in this field to develop higher and higher power devices which can extend and expand the various applications of these devices to other areas of interest and use.

Therefore, it is an object of this invention to provide an improved injection type laser diode.

It is yet a further object of this invention to provide an injection laser diode having an extremely high duty cycle.

It is still a further object of this invention to provide an improved laser diode having a high duty cycle which has improved heat dissipation characteristics.

It is still a further object of this invention to provide an improved injection laser diode wherein the emitting portion of the laser diode is extremely small and where the output of the diode has a reduced angular output.

It is still a further object of this invention to provide an improved method of producing an injection laser diode comprising the steps of preparing a substrate containing low angle grain boundaries; epitaxially growing an N+ layer on the substrate; diffusing in the gallium arsenide substrate zinc as an impurity with a spike-like profile; and fabricating a Fabry-Perot structure from the body.

Other objects, advantages and novel features of the invention will become apparent from the following detailed description of the invention when considered in conjunction with the accompaying drawings wherein:

FIGURE 1 shows the steps of producing the improved injection diode; and

FIGURE 2 shows one embodiment of the invention produced by the steps set forth in FIGURE 1.

The device of FIGURE 2 shows a semi-insulating first or middle layer 10 produced by the method disclosed in this application and is composed of gallium arsenide. Upon this substrate there is formed by epitaxially growth, a second or lower layer of N+ gallium arsenide 11. The third step of the process is the diffusion in the gallium arsenide of a P type impurity, zinc in this case, producing a third or upper layer 12 having a spike-like projection and constructing a Fabry-Perot device by properly treating the ends 14, 15 of the device to make them plane parallel so that laser action can take place.

The low angle grain boundaries of the first layer 10 produce a device in which there are a series of surfaces separating two regions of a solid in which the crystal axis are differentially orientated. It can be shown that such a boundary may be thought of as built upon the tilt $\theta$ of the axis across the surface.

The energy (per unit area) of the grain boundary is given by $$\frac{E}{E_m} = \left(\frac{\theta}{\theta_m}\right)\left(1 - L_m\left(\frac{\theta}{\theta_m}\right)\right)$$

where $E_m$ and $\theta_m$ are parameters depending upon the material.

The next step is to epitaxially grow the N+ layer on the gallium arsenide layer 10. The epitaxially growth provides an orientated inner growth between two solid phases. The surface of one crystal provides, through its lattice structure preferred positions for the disposition of the second crystal. The third step is the diffusion within the gallium arsenide layer of zinc and producing a spike-like profile in the layer 10. This may be accomplished in any of several ways, such as selectively masking the portion of the first layer 10 as the diffusion process takes place so that the spike-like projection is obtained. Such diffusion takes place until a junction 18 is produced between the N+ second layer and the P type layer. The fourth step is the fabrication of the Fabry-Perot structure from the grown semi-conductor device. This is accomplished by cutting and polishing the surfaces 14, 15 to produce a cavity between the surfaces which are parallel and to allow the production of a beam of coherent light to be produced by the device.

A Fabry-Perot device is one which consists of a cavity wherein there are two plane parallel plates or ends that are partially reflecting. In the cavity is a medium that conducts light such as a gas mixture or solid. A laser is such a device in that the stimulated emission of radiation is reflected back and forth between the parallel plates until a given strength is achieved and the beam of radiation leaves the cavity.

Obviously many modifications and variations of the present invention are possible in the light of the above teachings. It is therefore to be understood that within the scope of the appended claims the invention may be practiced otherwise than as specifically described.

We claim:
1. The method of producing an improved laser injection diode capable of lasing, consisting of the steps of:
   (a) preparing a substrate of semi-insulating semi-conductor first layer;
   (b) epitaxially growing a second layer of N on the semi-insulator first layer;
   (c) diffusing in the semi-insulator first layer of a third layer of P type impurity, having a spike-like profile projecting through said first layer forming a junction between said second layer of N type material and said third layer of P type material; and
   (d) fabricating a Fabry-Perot structure from said first, second and third layers by making opposing ends of said substrate first, second, and third layers plane parallel.

2. The method of claim 1 wherein the method includes selectively diffusing P type material through the semi-insulating material to produce a predetermined junction area with the N type material.

3. An improved injection type laser diode, comprising:
(a) a semi-insulating substrate first layer;
(b) a second layer epitaxially grown on said first substrate layer having a P type of impurity;
(c) a third layer of N type material diffused on said first substrate layer having a portion projecting across said substrate first layer forming a junction with said second layer; and
(d) said substrate first layer having first and second ends plane parallel forming a resonant Fabry-Perot cavity therebetween.

4. The improved laser of claim 3 wherein said first semi-insulating layer is of gallium arsenide.

5. The improved laser of claim 3 wherein said P type material diffused in said first layer is zinc.

References Cited

UNITED STATES PATENTS 3,245,002   4/1966   Hall _____ 331—94.5

JAMES D. KALLAM, Primary Examiner

S. BRODER, Assistant Examiner

U.S. Cl. X.R.

317—234